(12) United States Patent
Benham et al.

(10) Patent No.: US 6,518,376 B2
(45) Date of Patent: Feb. 11, 2003

(54) ETHYLENE POLYMERS

(75) Inventors: Elizabeth A. Benham, Bartlesville, OK (US); Max P. McDaniel, Bartlesville, OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

(21) Appl. No.: 09/854,744

(22) Filed: May 14, 2001

(65) Prior Publication Data

US 2001/0044507 A1 Nov. 22, 2001

Related U.S. Application Data

(62) Division of application No. 08/991,318, filed on Dec. 16, 1997, now Pat. No. 6,255,413.

(51) Int. Cl.[7] ............................. C08F 4/24; C08F 210/16
(52) U.S. Cl. ........................ 526/106; 526/348; 526/352
(58) Field of Search .................................. 526/348, 352, 526/106

(56) References Cited

U.S. PATENT DOCUMENTS 4,820,785 A * 4/1989 McDaniel et al. .......... 526/105
5,527,867 A * 6/1996 Bergmeister ................ 526/119

* cited by examiner

*Primary Examiner*—David W. Wu
*Assistant Examiner*—R. Rabago
(74) *Attorney, Agent, or Firm*—Williams, Morgan & Amerson, P.C.

(57) ABSTRACT

Disclosed herein are ethylene polymers having a density of 0.95 to 0.955, a melt index from 0.2 to 0.6 g/10 min., a high load melt index from 20 to 70 g/10 min., and a heterogeneity index from 10 to 16, and methods of preparing the same. In certain embodiments the polymers can have a shear ratio from 65 to 100.

3 Claims, No Drawings

ETHYLENE POLYMERS

This application is a divisional of application Ser. No. 08/991,318, filed Dec. 16, 1997 now U.S. Pat. No. 6,255,413.

FIELD OF THE INVENTION

This invention is related to the field of processes that produce polymers that comprise ethylene.

BACKGROUND OF THE INVENTION

There are many production processes that produce polymers that comprise ethylene. There are also many manufacturing processes that use these polymers to produce useful items. One of these manufacturing processes is called blow molding. In general, blow molding is useful for producing hollow plastic products. A principle advantage of blow molding is its ability to produce hollow shapes without having to join two or more separately molded parts.[1] In order to produce a good quality blow molded product, one needs to start with a good quality polymer. However, producing such good quality polymers is difficult. Therefore, the inventors provide this invention so that such good quality polymers are more readily obtainable.

[1] See SPI Plastic Engineering Handbook, Fifth Edition, pages 341–382, edited by M. L. Berins, published by Van Nostrand Reinhold (1991)

SUMMARY OF THE INVENTION

It is an object of this invention to provide a process to polymerize ethylene with at least one olefin to produce a polymer.

It is also an object of this invention to provide a polymer.

In accordance with this invention a process is provided. This process comprises polymerizing ethylene with at least one olefin to produce a polymer, wherein said polymerizing is conducted in a polymerization zone, where said polymerization zone is essentially free of cocatalyst, and wherein said polymerizing is conducted using a catalyst, where said catalyst comprises chromium oxide on a support, and where said support comprises silica, and where said support is essentially free of titania, alumina, and phosphates, and where said catalyst has been activated, and where said catalyst after being activated is then reduced, and wherein said polymerizing is conducted in the presence of hydrogen, and wherein the majority of said olefin is produced by said catalyst, during said polymerizing.

In accordance with this invention, an embodiment is directed to a polymer comprising the following properties: a density from 0.94 to 0.96, a melt index from 0.01 to 0.1 g/10 min., a high load melt index from 5 to 100 g/10 min., and a heterogeneity index from 4 to 14, a shear ratio from 50 to 200, and a Bottle ESCR 33 percent higher than a comparison resin.

DETAILED DESCRIPTION OF THE INVENTION

This invention, in general, is a process comprising polymerizing ethylene with at least one olefin to produce a polymer.

This polymerizing is conducted in a polymerization zone. This polymerization zone can be any convenient reactor. However, currently, it is preferred when the polymerization zone is a loop reactor. It is even more preferred when said polymerizing is conducted in a loop reactor under slurry polymerization conditions. Currently, the preferred diluent for slurry polymerization is isobutane. One of the important aspects of this polymerization zone is that it is essentially free of cocatalysts. This is because cocatalysts adversely affect the formation of the desired product. Examples of such cocatalysts are trihydrocarbylboron compositions and trihydrocarbylaluminum compositions. In general, the amount of these cocatalysts should be less than 1 part per million based on the weight of the diluent. However, it is most preferred when no cocatalyst is added to the polymerization zone.

The catalyst used in this invention comprises chromium oxide on a support. The amount of chromium on said support is in the range of about 0.01 to about 5 weight percent, preferably about 0.1 to about 3 weight percent, and most preferably from 0.5 to 2 weight percent, where such weight percents are based on the weight of the support. The catalyst should be essentially free of chromium halide compounds and organo-chromium compounds (hereafter "HO compounds") as these HO compounds can adversely affect the formation of the desired polymer. In general, the amount of these HO compounds should be less than 0.2 weight percent based on the weight of the support. However, it is most preferred if no HO compounds were added to the catalyst or to the polymerization zone.

The support comprises silica. Additionally, such support has silica as its major component by weight. It is most preferred when said support consists of silica, with little, if any, impurities. The support should be essentially free of titania, alumina, and phosphates (hereafter "TAP compounds") since these TAP compounds can adversely affect the formation of the desired product. In general, the amount of these TAP compounds should be less than 0.2 weight percent based on the weight of the support. However, it is most preferred when no TAP compounds are added to the catalyst or to the polymerization zone.

The support should have a surface area from about 200 to about 550 square meters per gram. It is more preferred when the support has a surface area from about 225 to 425 square meters per gram, and it is most preferred when said support has a surface area from 250 to 400 square meters per gram. Surface areas below about 200 $m^2/g$ have less activity, while surface areas above about 550 $m^2/g$ produces polymers that have a die swell that is too high, an amount of long chain branching that is too low, and possibly, a melt index that is too low.

The support should have a pore volume from about 0.7 to about 2.5 cubic centimeters per gram. It is more preferred when the support has a pore volume from about 0.8 to about 1.8 $cm^3/g$, and it is most when said support has a pore volume from 1 to 1.7 $cm^3/gram$. Pore volumes below about 0.7 $cm^3/g$ have less activity, while pore volumes above about 2.5 $cm^3/g$ adversely affect the formation of the desired polymer.

Methods of producing these types of catalysts are known in the art. See for example, U.S. Pat. Nos. 3,900,457; 4,081,407; 4,392,990; 4,405,501; 4,735,931; 4,981,831; the disclosures of which are hereby incorporated by reference.

The catalyst should be activated in an oxidizing ambient at a temperature from about 600 to about 900° C. It is even more preferred when the temperature is from about 625 to about 850° C., and it is most preferred when the temperature is from 645 to 820° C. At temperatures below about 600° C. the activity of the catalyst is reduced and the physical properties of the polymer are adversely affected. At temperatures above about 900° C. the catalyst can begin to sinter, thus hurting the polymerizing properties of said catalyst. Currently, the preferred oxidizing ambient is air. This activation is carried out for a time period of about 1 minute to about 50 hours. This allows a portion of the chromium in a lower valance state to be converted to a hexavalent state.

After activation, the catalyst is then reduced in an reducing ambient at a temperature from about 200 to about 550°

C. It is even more preferred when the temperature is from about 225 to about 525° C. and it is most preferred when the temperature is from 250 to 500° C. At temperatures below about 200° C. the catalyst may not be sufficiently reduced. At temperatures above about 550° C. the activity of the catalyst can be adversely affected and the melt index of the polymer can be too low. Currently, preferred reducing ambients are a mixture of carbon monoxide and nitrogen, or just carbon monoxide. This reduction is carried out for a time period of about 1 minute to about 50 hours. This allows a portion of the hexavalent chromium to be converted to a lower valent state.

In general, the oxidizing ambient promotes the formation of hexavalent chromium while the reducing ambient promotes the formation of chromium atoms that have a valance less than 6.

Said polymerizing is conducted at a temperature from about 94 to about 112° C. However, it is preferred when said polymerizing is conducted at a temperature from about 96 to about 110° C. and it even more preferred when said polymerizing is conducted at a temperature from 98 to 108° C. At temperatures below about 94° C. the activity of the catalyst is adversely affected. At temperatures above about 112° C. the reactor could foul due to the swelling of the polymer.

It is important to this invention that hydrogen be present in the polymerization zone. This is because hydrogen promotes the formation of the desired polymer by lowering the density of the polymer into the desired range. Currently, about 0.01 to 2 weight percent hydrogen can be used. However, it is preferred when about 0.05 to 1.5 weight percent is present in said polymerization zone, and it is more preferred when 0.1 to 1 weight percent of hydrogen is present in said polymerization zone. These weight percents are based on the weight of the diluent in said polymerization zone. It should be noted that hydrogen is often used to modify the molecular weight of a polymer, however, it is believed that this is the first time hydrogen has been used to produce a specific polymer of a specific density range. In other words. this is the first time hydrogen has been used to fine tune the density of a polymer.

The ethylene used should be polymerization grade ethylene. However, 100% ethylene produces better results.

The olefins are alpha-olefins having from 4 to 12 carbon atoms. One of the important features of this invention is that the catalyst produces these olefins during said polymerizing. This eliminates the need for having a source of alpha-olefins for use as comonomers. However, small amounts of alpha-olefins can be added, if desired, as long as the majority of said olefins, by weight, are generated in situ. Currently, 1-butene, 1-hexene, and 1-octene are the most preferred olefins.

The polymer produced needs to have the following properties in order to be a polymer that is good for blow molding applications.

The density needs to be from about 0.94 to 0.96 grams per cubic centimeter. However, it is preferred when the density is from about 0.945 to 0.96 g/cm³ and it is more preferred when the density is from 0.95 to 0.955 g/cm. Density is determine in accordance with ASTM D1505.

The melt index needs to be from about 0.01 to 1 grams per ten minutes. However, it is preferred when the melt index is from 0.1 to 0.8 g/10 min. and it is even more preferred when the melt index is from 0.2 to 0.6 g/10 min. Melt Index is determined in accordance with ASTM D 1238.

The high load melt index needs to be from about 5 to 100 grams per ten minutes. However, it is preferred when the high load melt index is from 10 to 80 g/10 min. and it is even more preferred when the melt index is from 20 to 70 g/10 min. High Load Melt Index is determined in accordance with ASTM D 1238.

The heterogeneity index (Mw/Mn) needs to be from about 4 to about 20. However, it is preferred when the heterogeneity index is from 6 to 20 and it is even more preferred when the heterogeneity index is from 8 to 18, and it is most preferred when the Heterogeneity index is from 10 to 16. The heterogeneity index was determined by gel permeation chromatography.

The Shear Ratio (HLMI/MI) needs to be from about 50 to about 200. However, it is preferred when the shear ratio is from about 65 to about 120 and it is even more preferred when the shear ratio is from 70 to 100.

The Bottle ESCR of an inventive resin should be about 33 percent higher than a comparison resin. However, it is more preferred when the Bottle ESCR of an inventive resin is 50 percent higher, and it is most preferred if the Bottle ESCR is 100 percent higher. For the purposes of this application the comparison resin is a resin made with the same catalyst as an inventive resin except that the catalyst that makes the control resin has not been reduced. Additionally, these resins are produced under substantially, if not identical, polymerization conditions.

Polymerization can be carried out in any manner known in the art such as gas phase, solution or slurry polymerization conditions. A stirred reactor can be utilized for a batch process, or the reaction can be carried out continuously in a loop reactor.

A preferred polymerization technique is that which is referred to as a particle form, or slurry process, wherein the temperature is kept below the temperature at which polymer swells badly. Such polymerization techniques are well known in the art and are disclosed, for instance, in Norwood, U.S. Pat. No. 3,248,179, the disclosure of which is hereby incorporated by reference.

Two preferred polymerization methods for the slurry process are those employing a loop reactor of the type disclosed in Norwood and those utilizing a plurality of stirred reactors either in series, parallel or combinations thereof wherein the reaction conditions are different in the different reactors.

The following examples are provided to further inform a person of ordinary skill in the art.

EXAMPLES

Example One

The following bench scale reactor runs demonstrate the unexpected density suppression that occurs when hydrogen is used. No cocatalyst was used in any of these runs. In these runs the chromium was supported on a silica support. The catalyst contained about one weight percent chromium, the support was mainly silica, and essentially free of titania, alumina, and phosphate, the support had a pore volume of 2.3 cm³/g, a surface area of 500 m²/g, and was activated for 3 hours in dry air at 871° C. then reduced (if indicated) for one half hour at 350° C. with carbon monoxide. About 0.05 grams of each catalyst was charged, under nitrogen, into a 2.4 liter autoclave reactor. Then exactly one liter of dry isobutane liquid was added as diluent, followed by 100 psi hydrogen pressure (if indicated). Finally ethylene was added to equal 550 psi. This pressure was maintained for about 1 to 1.5 hours (as indicated) as the reactor contents were stirred at 100° C. At the end of the run, the isobutane, ethylene, and hydrogen were flashed off and the dry polymer powder recovered. See Table One.

TABLE One

| Reduced | H$_2$ | Run Time | Melt Index | HLMI | HLMI/MI | Density |
|---|---|---|---|---|---|---|
| No | No | 60 | 1.5 | 85 | 50 | 0.9654 |
| No | Yes | 65 | 3.2 | 179 | 56 | 0.9678 |
| Yes | No | 78 | 0.39 | 33 | 85 | 0.9645 |
| Yes | Yes | 79 | 0.88 | 56 | 63 | 0.9498 |

It should be noted that only the combination of a certain oxidized and reduced catalyst with hydrogen produced the desired polymer.

Example Two

The following runs were made in a 600 gallon continuous loop reactor. The catalyst was 969MS from Davison Chemical, having a surface area of 300 m$^2$/g and pore volume of 1.6 cm$^3$/g. It contained 1% chromium on silica, and was activated for 10 hours at 760° C., before a two hour reduction at 371° C. with 10% carbon monoxide/90% nitrogen mixture. Residence time was set at about 75 minutes and reactor temperature was 101 to 104° C. Reactor conditions are shown in the Table Two.

TABLE Two

| Description | Invention | Alkyl Controls | | Control |
|---|---|---|---|---|
| reduction | yes | yes | yes | no |
| mol % H$_2$ | 0.55 | 0.55 | 0.2 | 0 |
| ppm TEB | 0 | 0.5 | 0.3 | 0 |
| Melt Index | 0.62 | 0.63 | 0.39 | 0.35 |
| Density | 0.952 | 0.949 | 0.95 | 0.952 |
| Die Swell | 5.18 | 5.26 | 5.27 | 5.45 |
| Bottle ESCR | 210 hrs. | 100 hrs. | 170 hrs. | 130 hrs. |
| Drop Impact | >12 ft. | >12 ft. | 11.5 ft. | >12 ft. |

Notice that the first run used hydrogen to suppress the density. It took about 0.55 mole percent hydrogen to accomplish a density reduction down to 0.952. This represents an invention run. In the next run, an attempt was made to use a cocatalyst. Notice, however, that only 0.5 parts per million of triethyl boron could be added, rather than the usual 8 parts per million used earlier in film runs, and that even this minute amount caused an overshoot down to 0.949 (the target was 0.952). In the third run a similar attempt was made with cocatalyst, this time the amount was further diminished down to 0.3 parts per million triethyl boron, but even here the density suppression overshot to 0.950 (target 0.952). The next run shows another control run, in which the catalyst was not reduced and no hydrogen was used either however, hexene was added to reduced the density. It is important to note the difficulty of using cocatalyst to lower the density of a polymer. It is difficult, if not impossible, in a commercial environment, to accurately measure and consistently apply the amounts of cocatalysts needed to achieve the desired results.

These resins were then blow molded into one gallon bottles weighing 105 grams. They were then tested for impact strength (water filled bottles were dropped from as high as 12 feet) and environmental stress crack resistance (ESCR). In the Bottle ESCR test, bottles were filled with a strong detergent (Orvus-K) and allowed to age in an oven at 60° C. Each day these Bottles were check for cracks. The number of hours before cracking is noted. In the drop test, each day these bottles were checked for failure until all had broken. The time for 50% failure is noted. Also noted in the table below is the layflat, or die swell, measured during the molding operation. In general, a low number is preferred.

Notice in the table that the invention run also provides the best balance of properties for a blow molding resin. Bottle ESCR is noticeably higher, despite its higher density (in general Bottle ESCR is favored by lower density). The impact strength was also quite good for the invention resin. Bottles tolerated a 12 foot drop without breakage. Notice also that the invention runs had lower die swell than all the other controls.

Example Three

The following runs were made in a 600 gallon continuous loop reactor. The conditions are shown in the Table Three.

A=Invention Runs: catalyst CO reduced and H$_2$ used in reactor

B=Control Runs: catalyst not CO reduced and no H$_2$ in reactor

C=Control Run: catalyst not CO reduced but H$_2$ used in reactor

TABLE Three

| | A-1 | A-2 | B-1 | B-2 | C-1 |
|---|---|---|---|---|---|
| Catalyst Type*: | EP-30 | EP-30 | EP-30 | HA-30 | 969MS |
| Pore Volume (cc/g) | 1.6 | 1.6 | 1.6 | 1.5 | 1.6 |
| Surface Area (sq m/g) | 300 | 300 | 300 | 400 | 300 |
| Activation Temperature ° C. | 788 | 788 | 871 | 760 | 760 |
| CO Reduction at 371° C. | Yes | Yes | No | No | No |
| Ethylene Conc. in Reactor (mol %) | 7.89 | 8.96 | 7.84 | 7.66 | 7.62 |
| Reactor Temp. ° C. | 103.8 | 103.1 | 95.1 | 106.3 | 102.0 |
| H2 Conc. in reactor (mol %) | .169 | .18 | 0 | 0 | .26 |
| hexane feed (as wt % of ethylene feed) | 0 | 0 | 0 | .68 | 1.51 |
| Melt Index (g/10 min) | .25 | .20 | .67 | .54 | .26 |
| High Load Melt Index (g/10 min) | 30.1 | 27.0 | 62.4 | 41.8 | 32.7 |
| HLMI/MI | 120.4 | 135.0 | 93.1 | 77.4 | 125.8 |
| Density (g/cc) | .9520 | .9508 | .9673 | .9578 | .9530 |
| Ash from catalyst residue (%). | .046 | .052 | .091 | .04 | .047 |

EP-30 catalyst available commercially from Crosfield Co.
HA-30 and 969MS available commercially from W.R.Grace Co.

Runs A-1 and A-2 are invention runs which show that the density of the resin is suppressed to the desired 0.950–0.952 level when the catalyst is CO-reduced and when H$_2$ is added to the reactor. This occurs even though no hexene or other comonomer or metal alkyl is fed to the reactor.

Run B-1 shows what happens when the catalyst is not CO reduced and when H$_2$ is not added to the reactor. The density is not suppressed, but instead is very high as expected from a homopolymer. Run B-2 shows that a significant amount of hexene must be fed to the reactor in order to suppress the density to only around 0.958 under these non-invention conditions.

Run C-1 shows an intermediate condition in which $H_2$ is added to the reactor but the catalyst is not CO-reduced. Notice that in order to suppress the density to only 0.953, a large amount of hexene must be fed to the reactor. Thus $H_2$ alone does not affect density, but only the combination of CO-reduced catalyst and $H_2$ in the reactor.

Example Four

The following runs were made in a 23 gallon continuous loop reactor. The catalyst was either 969MS from Davison Chemical, having a surface area of 300 $m^2/g$ and pore volume of 1.6 $cm^3/g$, or 969ID from Davison Chemical, having a surface area of 300 $m^2/g$ and a pore volume of 1.2 $cm^3/g$, or EP-30 from Crosfield Chemical, having a surface area of 300 $m^2/g$ and pore volume of 1.6 $cm^3/g$. Each contained 1% chromium on silica, and was activated for 10 hours at 760° C., before a two hour reduction at 371° C. with 10% carbon monoxide/90% nitrogen mixture. Residence time was set at about 75 minutes. No cocatalyst or hexene was added to the reactor. Other conditions are as shown in Table IV.

These resins were then also blown into 1 gallon bottles as described in the previous example. The properties of these bottles, and the resins themselves are shown in Table V.

From the properties below, notice that the bottle ESCR of these resins is quite good, particularly the 5202 types, even better than the controls. Processing, as measured by cycle time and head pressure, was equal or better than controls. Invention runs also provide better impact. Other properties are generally comparable to the controls, or even superior in some cases. Die swell is generally low for these resins but it is typical for pilot plant resins to have slightly higher die swell than plant finished controls, as we see here. The main point about die swell is that these numbers here are acceptable, and not high liked the silica-titania catalysts. These numbers would typically be above 50%. Table 6 shows the breadth of the molecular weight distribution as described by Mw/Mn and be HLMI/MI.

TABLE Four

|  | 8 | 9 | 10 | 12 | 13 |
|---|---|---|---|---|---|
| Catalyst | 1450F EP30 CO 700F | 1450F 969MS CO 700F | 1450F 969MS CO 700F | 1450F EP30 CO 700F | 1450F EP30 CO 700F |
| Ethylene mol % | 6.83 | 7.89 | 7.39 | 8.96 | 9.15 |
| Temperature F | 218.4 | 218.9 | 220.3 | 217.5 | 218.4 |
| $H_2$ mol % | 1.05 | .169 | .132 | .18 | .024 |
| MI | .53 | .25 | .34 | .20 | .22 |
| HLMI | 41.6 | 30.1 | 33.5 | 27.0 | 23.2 |
| Density (g/cc) | .9561 | .9520 | .9521 | .9508 | 9512 |
| Ash % | .082 | .046 | .038 | .052 | .069 |

TABLE Five

5502 Type Resins:

|  | Control HHM 5502 BN | Invention A | Control HHM 5202 BN | Invention B | Invention C | Invention D | Invention E |
|---|---|---|---|---|---|---|---|
| MI (g/10 mm) | 0.36 | 0.57 | 0.34 | 0.33 | 0.40 | 0.32 | 0.26 |
| HLMI (g/10 min) | 33.5 | 38.9 | 30.7 | 26.3 | 31.0 | 23.9 | 21.4 |
| HLMI/MI | 93 | 68.2 | 90.3 | 79.7 | 77.5 | 74.7 | 82.3 |
| Density (g/cc) | 0.955 | 0.956 | 0.951 | 0.952 | 0.953 | 0.951 | 0.951 |
| Die swell (%) | 41.3 | 44.4 | 41.3 | 46.9 | 47.7 | 48.0 | 48.0 |
| Bottle ESCR | 92 | 97 | 172 | 235 | 230 | >325 | >370 |
| Drop impact | 8.9 | 11 | 11.3 | 11.5 | 11.2 | 11.5 | 11.5 |
| Izod impact | 2.5P | 3.1P | 2.1P | 3.4P | 3.0P | 3.3P | 3.7P |

TABLE 6

Polymer properties

|  | HHM 5502 BN 6261499 | A | HHM 5202 BN 8161397 | B | C | D | E |
|---|---|---|---|---|---|---|---|
| MI (g/10 min) | 0.36 | 0.57 | 0.34 | 0.33 | 0.40 | 0.32 | 0.26 |
| HLMI (g/10 min) | 33.5 | 38.9 | 30.7 | 26.3 | 31.0 | 23.9 | 21.4 |
| HLMI/MI | 93.1 | 68.2 | 90.3 | 79.7 | 77.5 | 74.7 | 82.3 |
| Mw/1000 | 149 | 156 | 158 | 196 | 191 | 209 | 243 |
| Mn/1000 | 13.7 | 13.8 | 20.2 | 130.0 | 12.7 | 13.8 | 11.8 |
| Mw/Mn | 10.9 | 11.3 | 7.8 | 15.1 | 15.0 | 15.2 | 20.6 |

That which is claimed is:

1. A polymer comprising the following properties: a density from 0.95 to 0.955, a melt index from 0.2 to 0.6 g/10 min., a high load melt index from 20 to 70 g/10 min., a heterogeneity index from 10 to 16, and a shear ratio from 65 to 100.

2. A polymer produced by a process comprising polymerizing ethylene with at least one olefin to produce said polymer, wherein said polymerizing is conducted in a polymerization zone,
where said polymerization zone is essentially free of cocatalyst, and
wherein said polymerizing is conducted using a catalyst,
where said catalyst comprises chromium oxide on a support, and
where the amount of said chromium on said support is from about 0.01 to 5 weight percent, and
where said support comprises silica, and
where said support is essentially free of titania, alumina, and phosphates, and
where said support has a surface area from about 200 to about 550 square meters per gram, and
where said support has a pore volume from about 0.7 to about 2.5 cubic centimeters per gram, and
where said catalyst has been activated at a temperature in the range of about 600° C. to about 900° C. by using a oxidizing ambient, and
where said catalyst after being activated is then reduced at a temperature in the range of about 200° C. to about 550° C. by using a reducing ambient, and wherein said polymerizing is conducted in the presence of hydrogen, and wherein the majority of said olefin is produced by said catalyst, during said polymerizing.

3. A polymer according to claim 2 wherein said polymer has a density from 0.95 to 0.955, a melt index from 0.2 to 0.6 g/10 min., a high load melt index from 20 to 70 g/10 min., and a heterogeneity index from 10 to 16.

* * * * *